Figure 3:
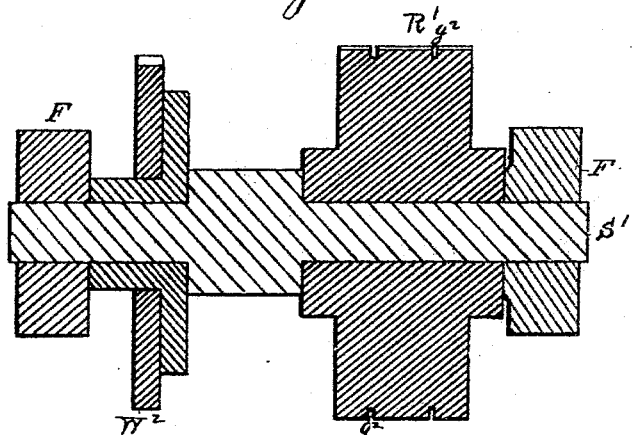

(No Model.) 11 Sheets—Sheet 1.
G. E. NORRIS & W. E. HAGAN.
MACHINE FOR MAKING MATCHES.
No. 321,445. Patented July 7, 1885.
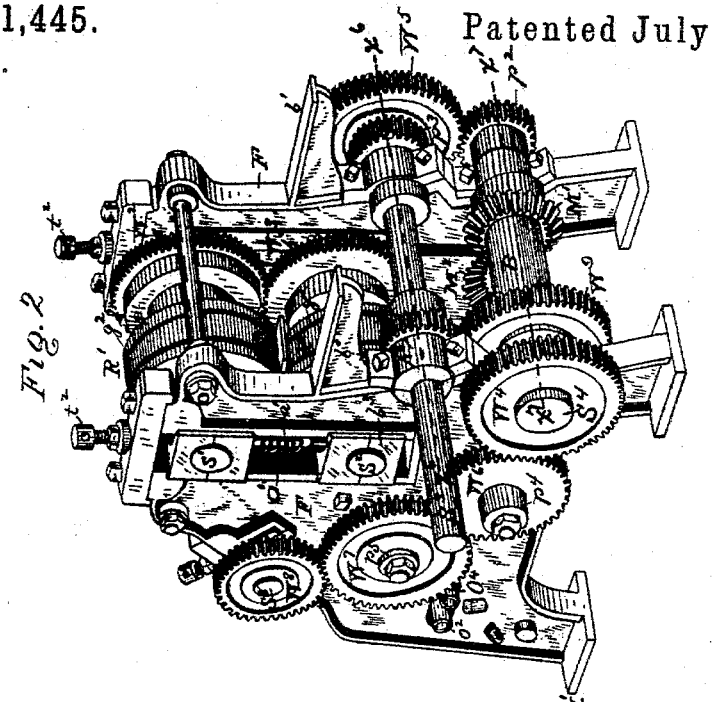
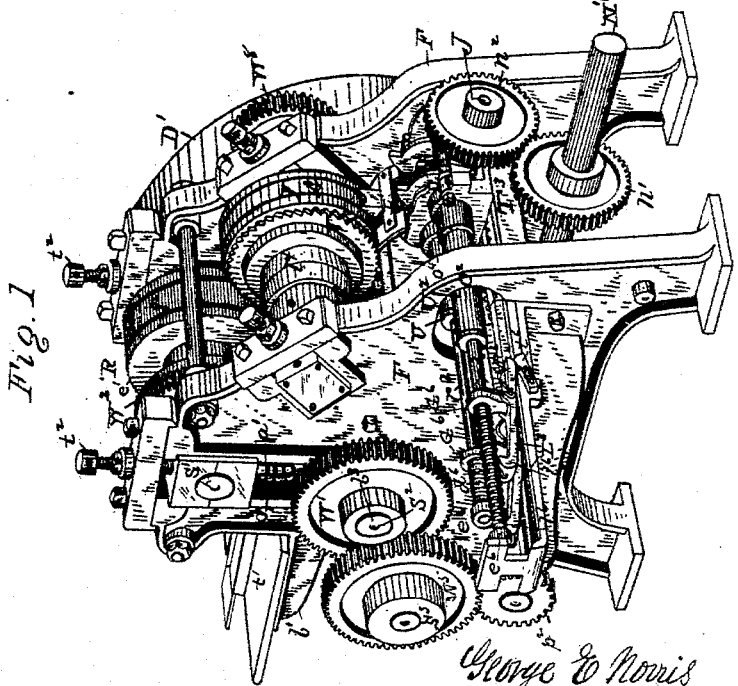
WITNESSES:
Stanley M. Holden.
Charles S. Bruntnall.
George E Norris
William E Hagan  INVENTORS
BY
W. E. Hagan  ATTORNEY (No Model.) 11 Sheets—Sheet 2.

G. E. NORRIS & W. E. HAGAN.
MACHINE FOR MAKING MATCHES.

No. 321,445. Patented July 7, 1885.

WITNESSES:
Stanley M. Holden
Charles S. Bumtrall

INVENTORS
George E. Norris
William E. Hagan
BY
W. E. Hagan ATTORNEY

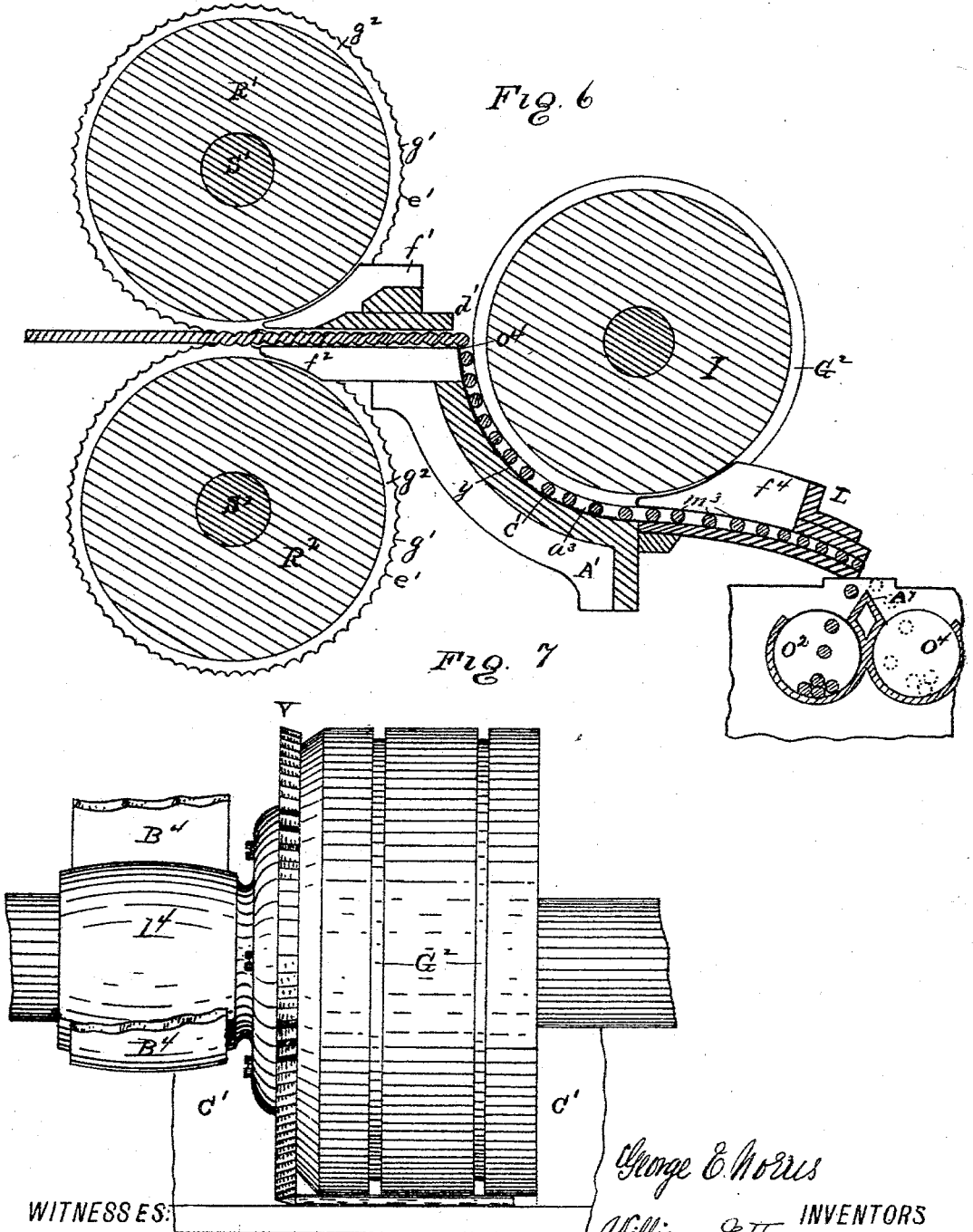

(No Model.) 11 Sheets—Sheet 4.
G. E. NORRIS & W. E. HAGAN.
MACHINE FOR MAKING MATCHES.
No. 321,445. Patented July 7, 1885.
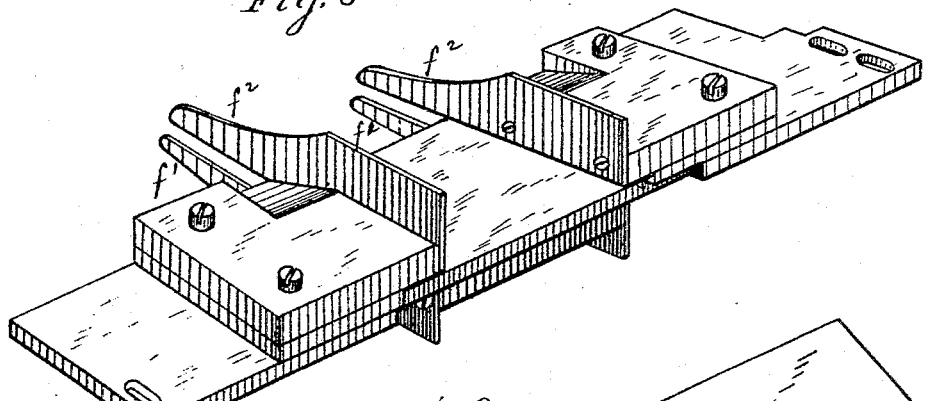
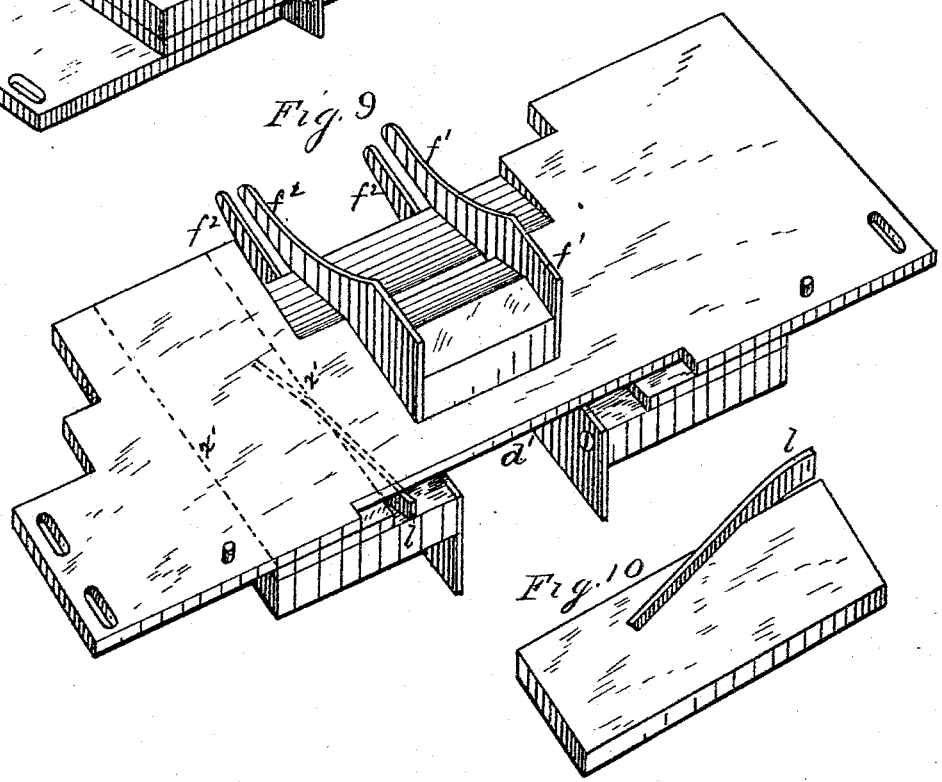
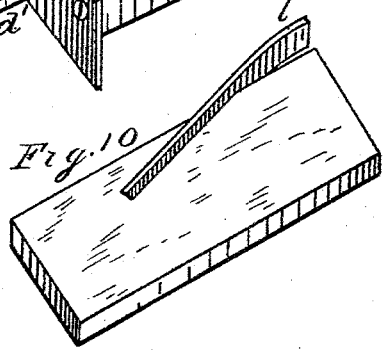

(No Model.) 11 Sheets—Sheet 5.

G. E. NORRIS & W. E. HAGAN.
MACHINE FOR MAKING MATCHES.

No. 321,445. Patented July 7, 1885.

WITNESSES:
Stanley M. Holden.
Charles S. Bruntnall

George E. Norris
William E. Hagan   INVENTORS

BY

W. E. Hagan   ATTORNEY (No Model.) 11 Sheets—Sheet 6.

G. E. NORRIS & W. E. HAGAN.
MACHINE FOR MAKING MATCHES.

No. 321,445. Patented July 7, 1885.

WITNESSES:
Stanley M. Holden
Charles S. Quintnall

George E. Norris
William E. Hagan INVENTORS

BY
W. E. Hagan ATTORNEY (No Model.) 11 Sheets—Sheet 7.
G. E. NORRIS & W. E. HAGAN.
MACHINE FOR MAKING MATCHES.

No. 321,445. Patented July 7, 1885.

WITNESSES:
Stanley M. Holden.
Charles S. Paintnall

George E. Norris
William E. Hagan
INVENTORS

BY
W. E. Hagan
ATTORNEY (No Model.) 11 Sheets—Sheet 8.
G. E. NORRIS & W. E. HAGAN.
MACHINE FOR MAKING MATCHES.
No. 321,445. Patented July 7, 1885.
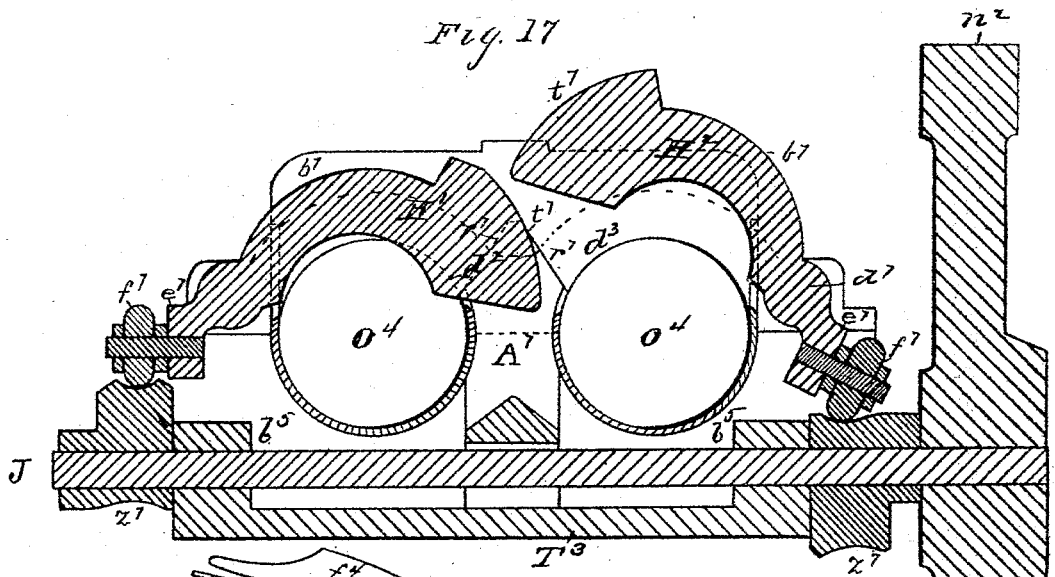
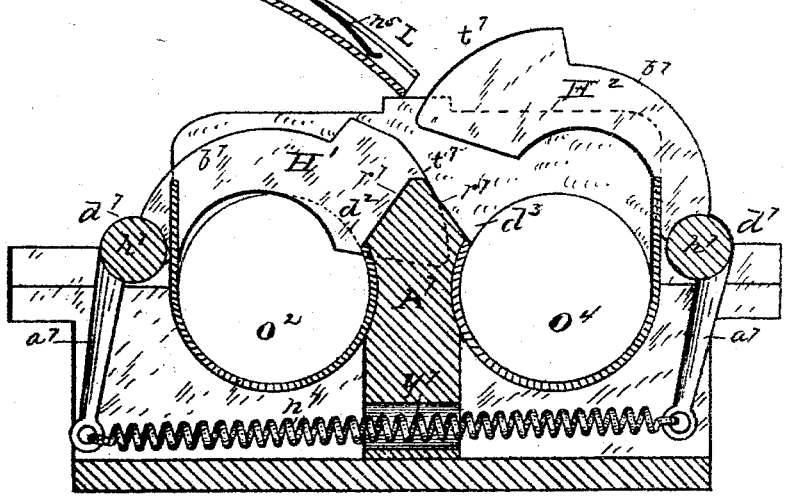
WITNESSES:
INVENTORS
George E. Norris
William E. Hagan
BY
W. E. Hagan
ATTORNEY

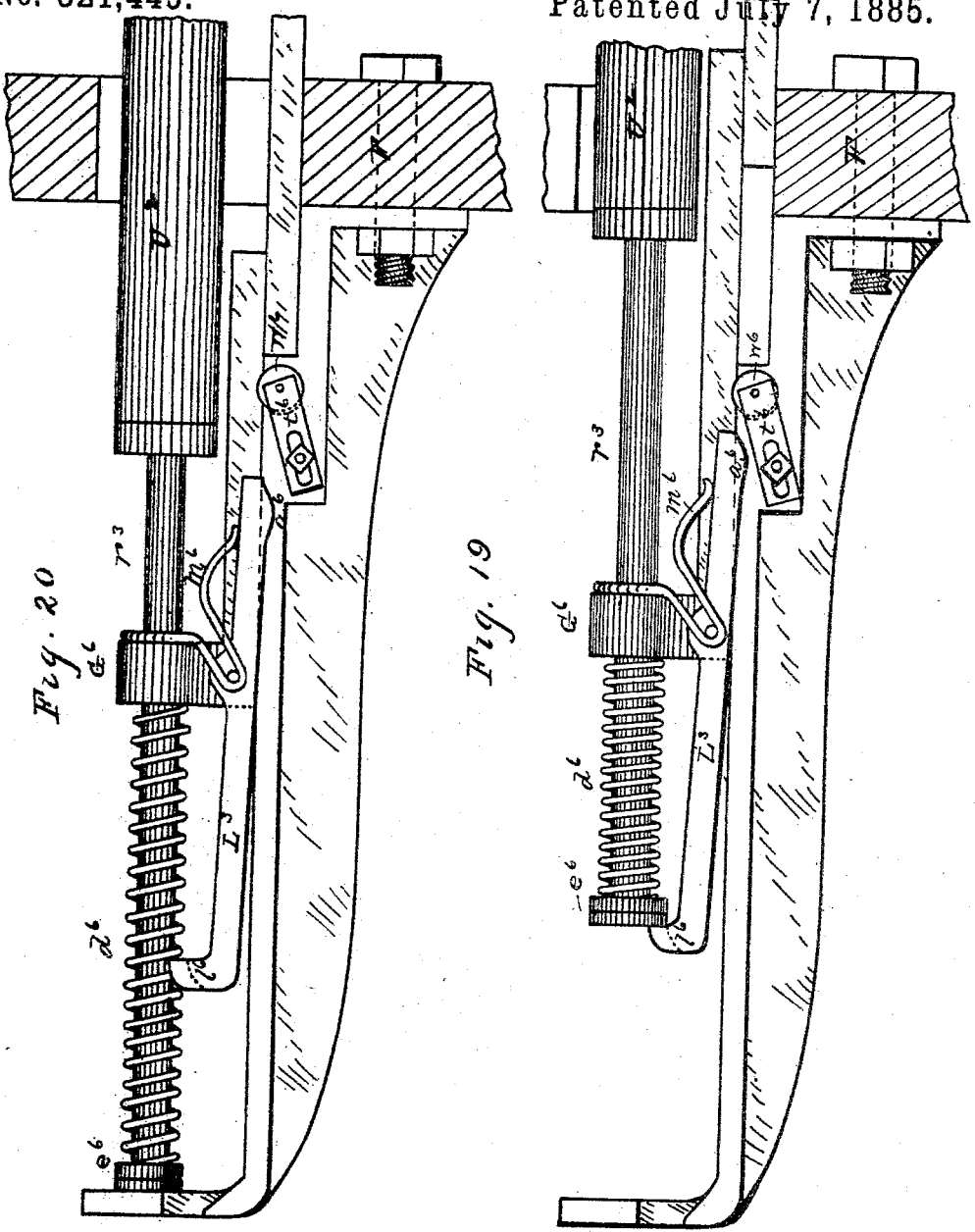

(No Model.) 11 Sheets—Sheet 10.
G. E. NORRIS & W. E. HAGAN.
MACHINE FOR MAKING MATCHES.
No. 321,445. Patented July 7, 1885.
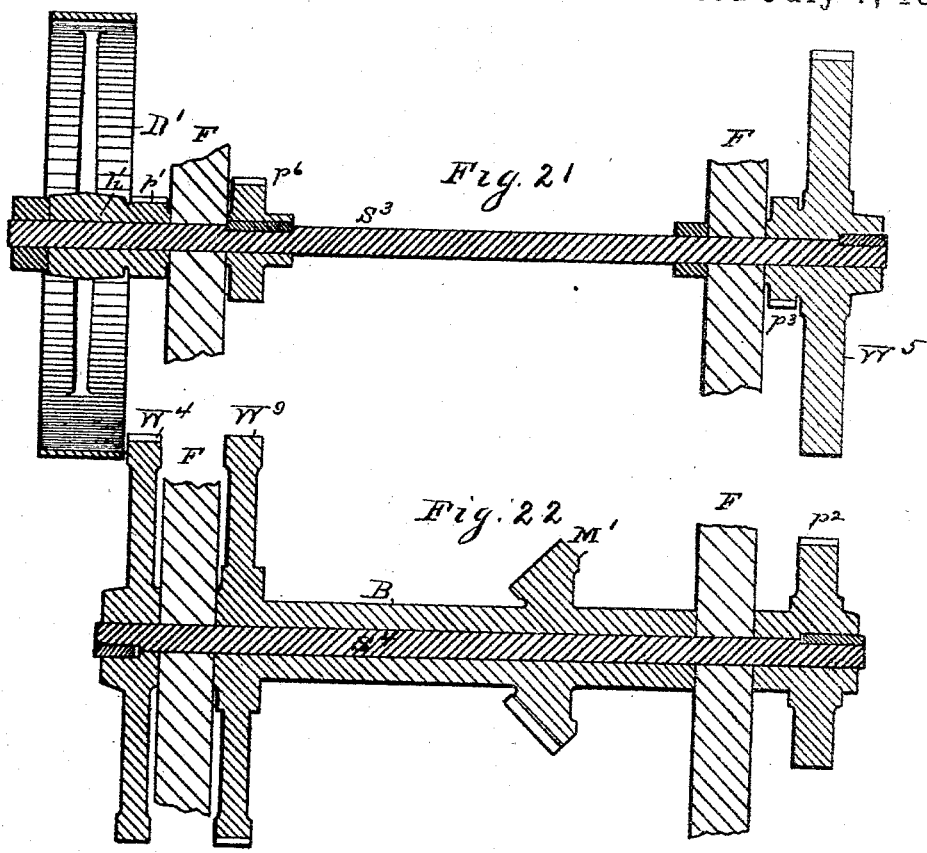

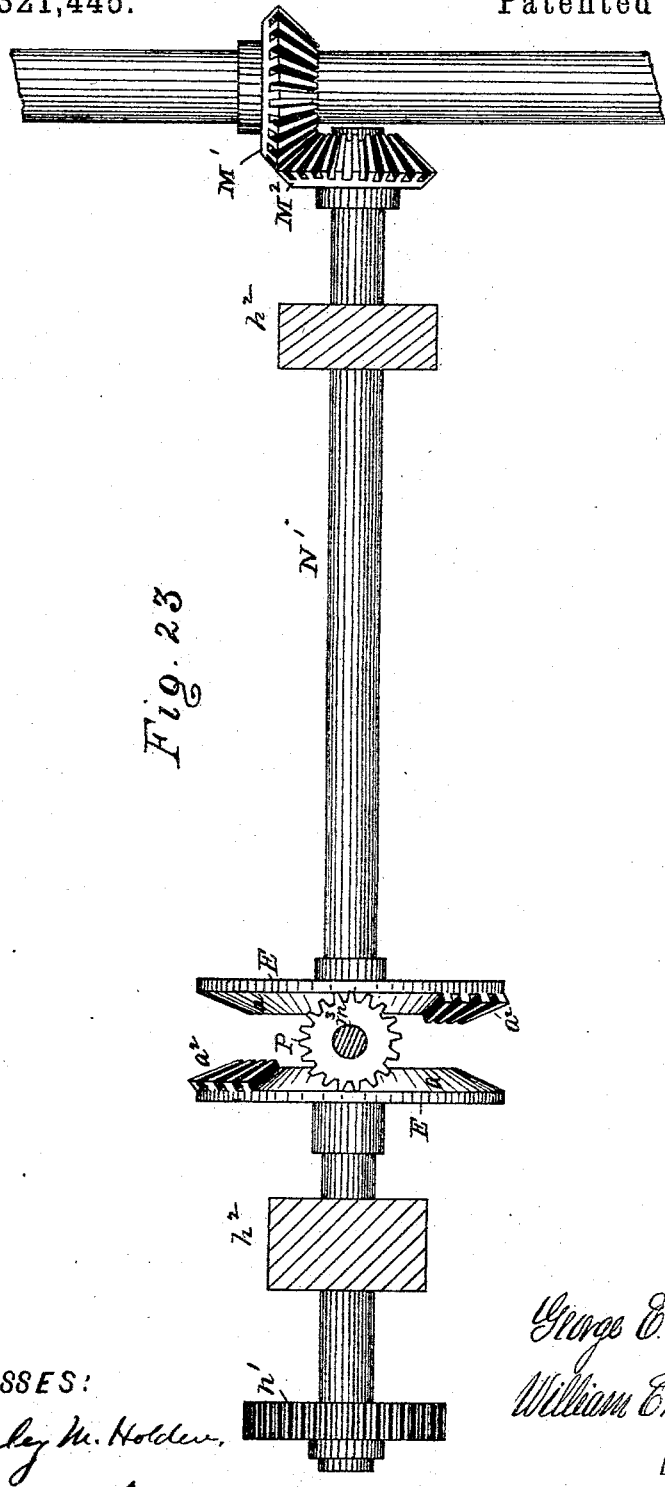

UNITED STATES PATENT OFFICE.

GEORGE E. NORRIS AND WILLIAM E. HAGAN, OF TROY, ASSIGNORS OF ONE-THIRD TO JAMES K. P. PINE, OF LANSINGBURG, NEW YORK.

MACHINE FOR MAKING MATCHES.

SPECIFICATION forming part of Letters Patent No. 321,445, dated July 7, 1885.

Application filed February 13, 1885. (No model.)

*To all whom it may concern:*

Be it known that we, GEORGE E. NORRIS and WILLIAM E. HAGAN, both of the city of Troy, county of Rensselaer, State of New York, have jointly invented a new and useful Improvement in Machines for Making Match Blanks or Splints, and of which the following is a specification.

Our invention relates to machines for making match-blanks or match-splints, and more particularly to certain improvements on that class of machines that are constructed to slit up a veneer of wood for that purpose by means of rollers, between which the veneer is passed, the object and purpose of our invention being to cut the blanks or splints from a veneer of wood, to point them, to give a smooth finish to their rounded surfaces, and to put them into boxes preparatory to dipping them after having been placed therein.

Our invention consists, as will be more fully detailed hereinafter in connection with its illustration, in the combination of two rollers that are geared together so as to have synchronous motion, and which rollers have inwardly-curved grooves and intermediately-arranged cutting-edges that are constructed on the cylindrical faces of the rollers parallel to their axes, said cutting-edges being located so as to meet as the rollers revolve, and said cutting-rollers each being constructed with ring-form grooves arranged thereon circumferentially to their axes, so as to intersect at right angles the other grooves and their cutting-edges, a horizontal trough or passage-way, having fingers on that end of it which is adjacent to the cutting-rollers, which fingers are adapted to enter said ring-form grooves, so as to underrun the veneer of partly-severed blanks, to strip them off the rollers, and to direct them into said trough or horizontal passage-way, whence they are forced or crowded by their continued delivery from the cutting-rollers, a downwardly-curved passage for the blanks connecting with said horizontal trough, a rubber roller actuated to rotate with its cylinder-face coincidently with said curved passage, but at a sufficient distance therefrom to allow the passage of the blanks, said rubber roller being adapted to roll said blanks along and over said curved passage or a polishing-surface arranged thereon, and a saw having cylindrically-arranged teeth that incline inwardly, said saw having a hub-bearing adapted to run on said rubber-roller shaft independently of the latter, and constructed to chamfer off and point one end of each of the blanks.

Our invention also consists, as will be more fully detailed hereinafter in connection with its illustration, in the combination of two boxing-tubes, said tubes each being provided with an oscillating hopper-guide adapted to alternatingly direct the blanks coming from the pointing and polishing mechanism into each of said boxing-tubes, a piston constructed and actuated to move in said tubes attached on opposite intervals of motion to force the blanks from out the tubes into a box placed on one end of each of said tubes and the filled box from off the latter, as will be designated in the claims.

Our invention also consists, as will be more fully detailed hereinafter, in the subcombination of the parts where performing specific function, as will be designated in the claims.

Accompanying this specification, to form a part of it, there are eleven plates of drawings containing twenty-three figures illustrating our invention, with the same designation of its parts by letter-reference used in all of them.

Figure 4:
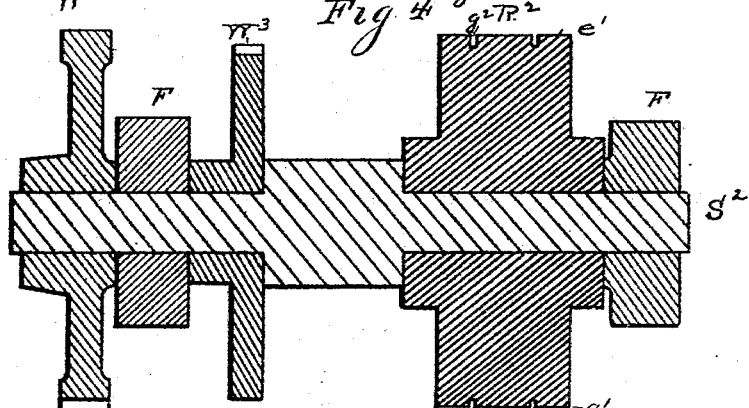

Of these illustrations, Figure 1 is a perspective of the machine taken with one side and the delivery end of the apparatus facing the view, with the belt actuating the blank-pointing saw omitted. Fig. 2 is a perspective of the machine with one side and the feeding end of the machine turned toward the sight, and with the driving-pulley removed. Fig. 3 is a section taken longitudinally and vertically through the upper cutting-roller, its shaft, the bearings of the latter, and the gear-wheel by which it connects with the lower cutting-roller, so as to have synchronous motion with the latter. Fig. 4 designates a longitudinal vertical section of the lower cutting-roller, its shafts, the bearings for the latter, the gear-wheel by which it connects with the upper cutting-roller to communicate motion to the latter, and a gear-wheel on said lower cutting-roller shaft, from which it receives power.

Figure 5:
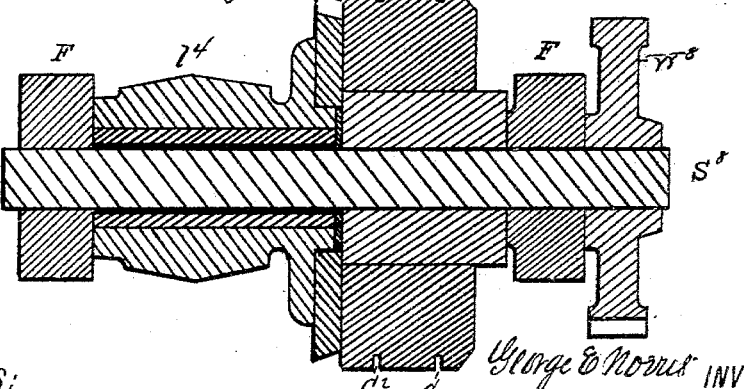
Figure 11:
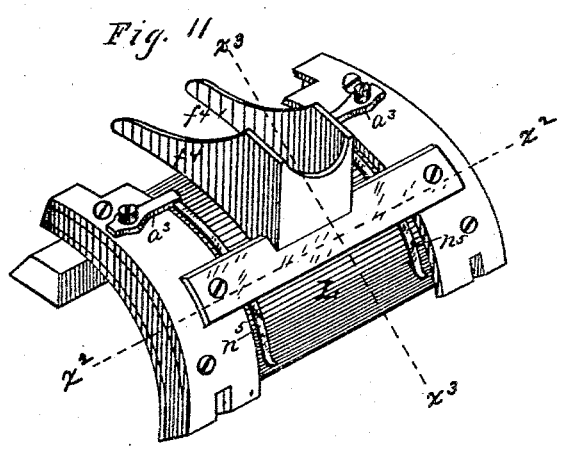
Figure 12:
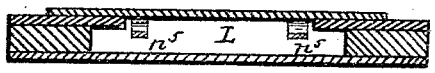
Figure 13:
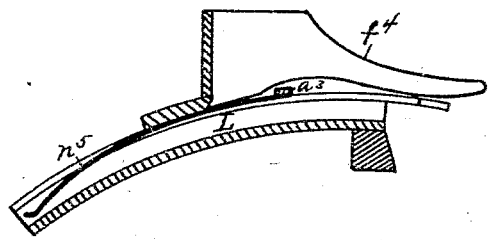
Figure 14:
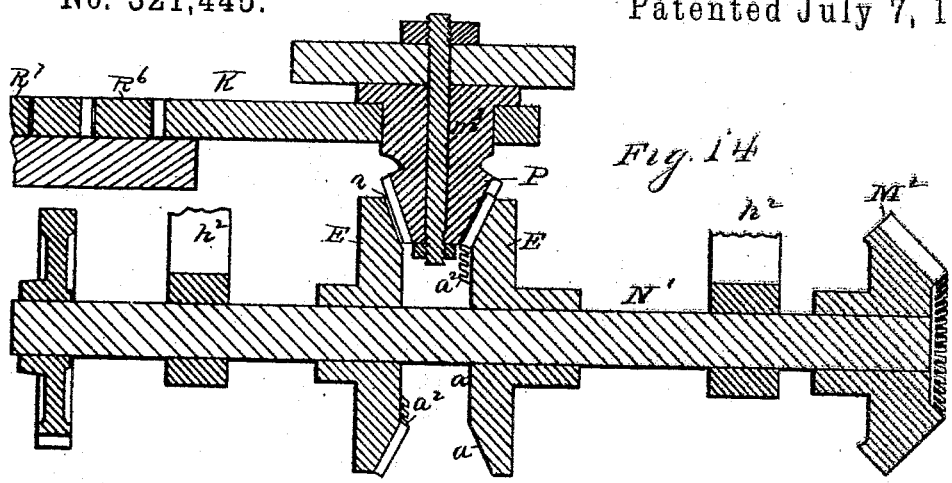
Figure 15:
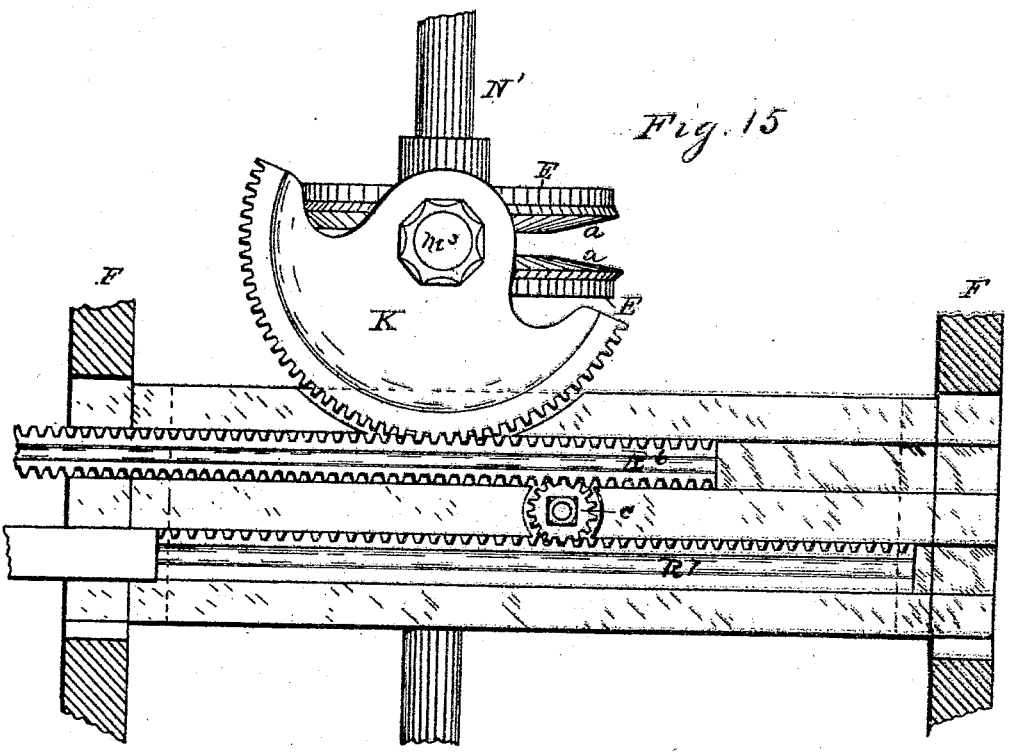
Figure 16:
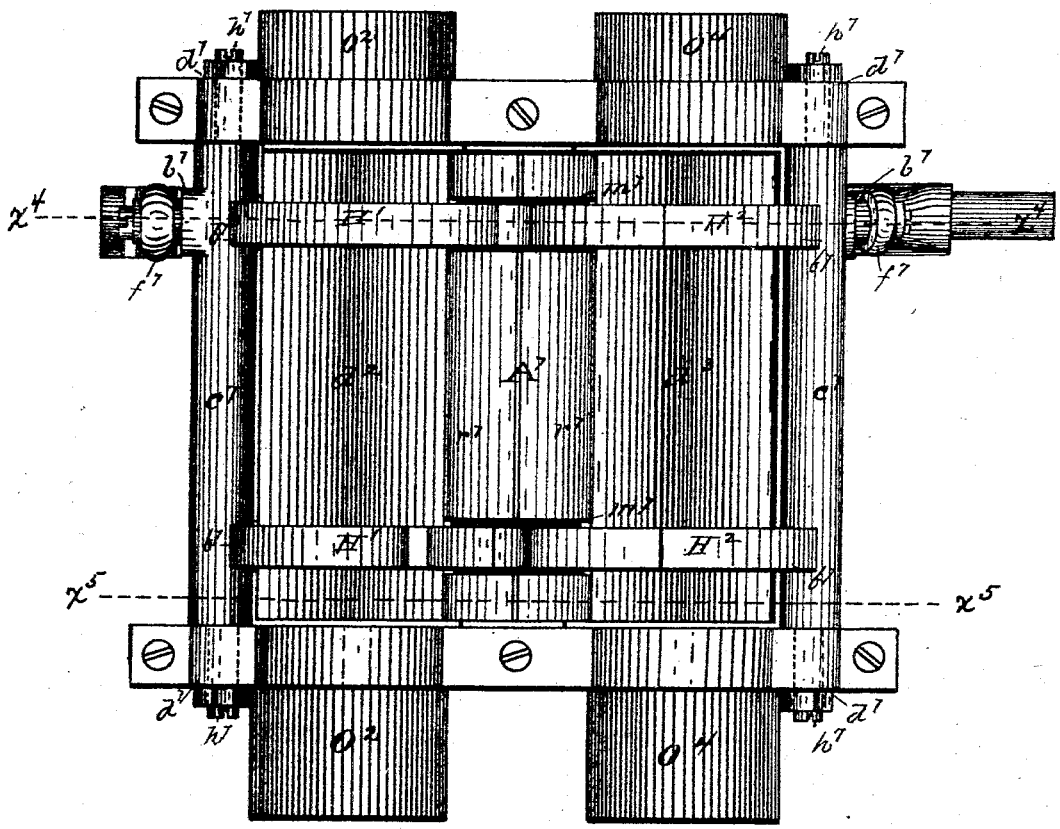

Fig. 5 is a longitudinal vertical section of the rubber-roller, the saw having cylindrically-arranged and inwardly-beveled teeth, and the drum for the belt actuating the saw. This illustration shows in section, also, the bearings of the rubber-roller shaft, also the latter, the hub-bearing of the ring-saw, and a gear-wheel on said shaft for receiving and communicating power thereto. Fig. 6 is a cross-vertical section taken through the two cutting-rollers on the line of one of their ring-form grooves; also through one of the fingers of the horizontal passage-way or trough, and also through the latter; also vertically through the rubber roller on the line of one of its ring-form grooves; also through one of the stripping-fingers that enter said grooves in the rubber roller to free the blanks adhering thereto; and also vertically through the curved passage-way formed between the curved polishing-surface and the cylindrical face of the rubber roller; and also through the curved passage leading to the boxing mechanism, all the parts of this figure being taken with the parts in position as in use. Fig. 7 is a side elevation of the detached rubber roller, its shaft in part, and the saw having cylindrical teeth, and a part of the belt actuating the saw. This illustration shows also the relative position of the ring-form grooves that are circumferentially made in the cylindrical face of the rubber roller; also the position of the circular saw, and a blank or splint that is being chamfered off or pointed by the combined action of said rubber roller and the saw. Fig. 8 is an enlarged perspective of the horizontal passage-way or trough, and its fingers for stripping from off the cutting-rollers the adhering blanks, and for conveying the latter to the curved passage-way between the polishing-surface and the rubber roller, the parts illustrated in this figure being shown as detached from the other mechanism and taken with their top uppermost. Fig. 9 is a perspective of the same parts that are shown at Fig. 8, but herein shown as turned over, and with what is their under surface when in position in the machine being in this figure shown as uppermost. Fig. 10 is a perspective of a part of the trough or horizontal passage-way cut from the parts on the lines $x'\ x'$ of Fig. 9, to illustrate the position of a side leaf-spring in the horizontal trough or passage-way. Fig. 11 is a perspective of the curved trough or passage-way constructed with fingers to strip the finished blanks from off the rubber roller, and which trough or passage-way leads to the boxing mechanism, all the parts of this figure being shown as detached from the other mechanism. Fig. 12 is a section taken on the line $x^2\ x^2$ of Fig. 11. Fig. 13 is a section taken on the line $x^3\ x^3$ of Fig. 11. Fig. 14 illustrates, as detached from the other mechanism, and in a longitudinal vertical section, the boxing-mechanism shaft, its bearings, and the hangers in which the latter are formed, which shaft, when in position in the machine, is arranged crosswise thereof. This illustration shows in vertical section also, as arranged on said shaft to move with it, two facing beveled gear-wheels having oppositely-omitted or broken-out gears, and which wheels are shown as having an intermediately-arranged beveled pinion constructed with a vertical shaft, on the upper end of which there is attached a segmental rack-wheel, which receives reciprocating rotation from said two broken-out gear-wheels and beveled pinion and shaft. This rack-wheel meshes into a rack, to communicate reciprocating motion thereto. This Fig. 14 shows, also, a beveled gear-wheel in section, as arranged on one end of this cross-shaft for receiving power, and on its other end another gear-wheel that communicates motion to the oscillating hoppers of the boxing mechanism. Fig. 15 shows as detached from the other mechanism a top view of the shaft illustrated at Fig. 14, showing, also, the position on said shaft of the two facing gear-wheels having oppositely-omitted or broken-out gears, and illustrating the position of the rack-wheel arranged on the vertical shaft of the beveled pinion for receiving reciprocating rotation from said gear-wheels having oppositely-omitted gears. This illustration shows the engagement of the rack-wheel with one of the racks, and the engagement of the racks with each other by means of an intermediately-placed pinion having a fixed pintle. Fig. 16 is a top view of the boxing-tubes and their oscillating hopper-guides, said parts being shown as detached from the other mechanism and enlarged in proportion. Fig. 17 is a cross-section of the boxing-tubes and hopper-guides, taken on the line $x^4\ x^4$ of Fig. 16. Fig. 18 is a cross-section taken on the line $x^5\ x^5$ of Fig. 16. Fig. 19 is a side elevation of one of the boxing-pistons and a part of one of the boxing-tubes, the piston being shown as forced into the boxing-tube with which it connects. Fig. 20 shows the same parts that are shown at Fig. 19, but with the piston moved out from the boxing-tube. Both Figs. 19 and 20 show also other features of the boxing mechanism. Fig. 21 is a longitudinal vertical section through the driving-pulley, hub-bearing, a gear-wheel on the hub, and the shaft on which it turns, this illustration being taken on the line $x^6\ x^6$ of Fig. 2. Fig. 22 is a horizontal vertical section taken through the shaft that communicates power to the cross-shaft illustrated at Figs. 14 and 15, this figure being taken on the line $x^7\ x^7$ of Fig. 2. Fig. 23 is a view of the detached cross-shaft, its two facing gear-wheels having broken-out gears, and its connection with the shaft from which it receives power, the latter being shown in part.

The several parts of the mechanism thus illustrated are designated by letter-reference, and the function of the parts is described as follows:

The letter F indicates the frame, and $t'$ a feeding-table arranged thereon by means of supporting-brackets $b'$.

The letters R' and R² designate two cutting-rollers that are made on their cylindrical faces with grooves $g'$ and intermediately-arranged cutting-edges $e'$, which grooves and cutting-edges are made in the cylindrical faces of the rollers in lines parallel to their axes. These cutting-rollers are also made with two ring-form grooves, $g^2$, which are arranged in the cylindrical face of the said rollers circumferentially to their axes, so as to be vertically parallel with each other in each roller. The upper of these rollers, and that indicated at R', has a shaft, S', made to journal in bearings that are vertically adjustable against a spring, $a'$, arranged beneath them in a passage, $o'$, in the machine-frame, and by set-screws $t^2$ arranged in the top of the latter.

The letter S² designates the shaft of the lower cutting-roller, R², one end of which has its bearing, as indicated at $b^3$, and the other end of said shaft has its bearing in the machine-frame, and where at the end projected through the latter it has arranged thereon the gear-wheel W' for receiving power.

The letter W² indicates a gear-wheel arranged on the upper cutting-roller shaft, S', and the letter W³ a gear-wheel on the lower cutting-roller shaft, S². These gear-wheels on the cutting-roller shafts are of the same size, and are arranged to mesh into each other to communicate power from one to the other, to revolve at the same speed, and so as to bring the cutting-edges of each roller in cutting coincident with those of the other as they are rotated.

The letter D' designates the driving-pulley, which is shown as applied to the machine in the perspective, Fig. 1, and in a diametrical section at Fig. 21. This pulley D' has a hub-bearing, (indicated at $h'$,) and on the lateral extension of the hub there is constructed the pinion $p'$. This hub and pulley D' turn on the shaft S³, and the pinion $p'$ meshes into the gear-wheel W⁴, arranged on the shaft S⁴, to communicate motion to the latter, and said shaft S⁴, at its end opposite to that at which it receives power, is constructed with the pinion $p^2$, the latter meshing into the gear-wheel W⁵ on the shaft S³, to turn the latter and to actuate a pinion, $p^3$, located on said shaft S³, on the inner side of the gear-wheel W⁵, and which pinion $p^3$ meshes into the gear-wheel W', on the lower cutting-roller shaft, S², to communicate motion to the cutting-rollers. The gear-wheel W⁴ on the shaft S⁴ engages with the gear-wheel W⁶, that turns on a fixed pin or pintle, $p^4$, attached to the side of the machine-frame. The gear-wheel W⁶ meshes into a gear-wheel, W⁷, that also turns on a fixed pin or pintle that is attached to the side of the machine-frame, said pintle being indicated at $p^5$; and the said gear-wheel W⁷ meshes into the gear-wheel W⁸ on the rubber-roller shaft S⁸, to actuate the said rubber roller. (Indicated at I.)

The letter $p^6$ indicates a pinion on the shaft S³, which makes a geared connection with a wheel, W⁹, on the sleeve B, the latter being adapted to turn on the shaft S⁴, as indicated in section at Fig. 22.

The letter M' designates a beveled gear-wheel arranged on, so as to turn with, the sleeve B, and this wheel M' engages with a beveled gear-wheel, M², on the front end of the cross-shaft N', the latter having its bearings in hangers $h^2 h^2$, as shown at Figs. 14 and 23. This cross-shaft has arranged upon it two facing beveled gear-wheels, E E, which have the oppositely-arranged perimetral gears $a^2 a^2$ and intermediate oppositely-located perimetral blank places, $a\ a$.

The letter P designates a beveled pinion arranged between these wheels E E, having a vertical shaft, $m^3$, and K a segmental rack-wheel on the top of said shaft. As the shaft N' is revolved, the wheels E E communicate reciprocating rotation to the pinion P, its vertical shaft, and the rack-wheel K.

The letter $n'$ indicates a gear-wheel arranged on that end of the cross-shaft N' which is opposite to that at which the said shaft receives power, and this wheel $n'$ engages with a gear-wheel, $n^2$, located on the outer end of a short cross shaft, J, the latter having its bearings $b^5$ $b^5$ in the table T³, which supports the boxing mechanism, as indicated at Figs. 1 and 17. This short cross-shaft J, by means of cams arranged thereon, operates the oscillating hopper-guides of the boxing mechanism, as will be subsequently described herein.

The letter $d'$ designates a horizontal trough or passage-way, which is inclosed so as to have an interior width a little greater than the width of the veneer of partly-cut blanks, and a depth a little greater than the thickness of the veneer or the diameter of the blanks. This trough is constructed with two upper fingers, $f^2 f^2$, and two lower fingers, $f' f'$, projected from its end where adjacent to the cutting-rollers. The upper fingers are arranged to enter the ring-form grooves of the upper cutting-rolls, and the lower fingers to enter the ring-form grooves of the lower roller. With these fingers thus constructed and placed with reference to the cutting-rollers, the sheet of passing and partly-cut blanks is underrun by them, and by the action of both sets of them it is stripped therefrom and directed into the trough $d'$, and while passing through the latter, from the expelling and crowding force of the cutting-rollers, the partly-cut veneer is forced closely up to one side of the trough $d'$ by means of a leaf-spring, $l$, located in one side of said trough, along the face of which spring the side of the veneer must pass.

The letter C' designates a concave guideway or plate that is formed on a support, A', and having its upper end connected with the discharge end of the trough $d'$, and adapted to have arranged upon it, when desired, a polishing material, as indicated at $y$.

The letter I designates the rubber roller, which is arranged upon its shaft so that its cylindrical face shall be in juxtaposition to and coincide in curve with the concavity of the curved guide-plate C', the roller being arranged just near enough to the latter that when rotating to leave a passage-way, $a^3$, for the movement of the blanks $m^3$ between the surface of the roller and the face of the curved surface of the guide-plate C'. Thus arranged the rubber roller revolves with a rotation that moves its cylindrical face downward where it passes the delivery end of the trough $d'$, and the surface of the roller coming in contact with the partly-severed veneer projected at the opening in the trough $d'$ separates the splints or blanks over the abrupt edge $o^4$ of the said trough and carries them forward in succession, by frictional contact with the roller, over the concave conveying-plate in the space between the roller and the plate and shoves them into the passage-way of the trough L. While being thus subjected to the action of the rollers the blanks are cleared of splinters or adhering fiber.

The letter V indicates a ring-form saw having cylindrically-arranged and inwardly-beveled teeth, said saw having a hub-bearing, $l^4$, arranged to run on the rubber-roller shaft.

The letter $B^4$ designates a belt adapted to run on said hub and to a pulley separate from the machine, to communicate power to said saw.

The letter L indicates another trough, having fingers $f^4 f^4$, arranged to run in the two circumferential grooves $G^2$, formed on the cylindrical face of the rubber roller. The purposes of these fingers is to free the finished blanks from the rubber roller and direct them into the trough L.

The letters $n^5 n^5$ indicate springs that are attached to offset $a^3$, on the sides of the trough L, which springs act to keep the blanks within the trough as crowded toward the boxing mechanism.

The boxing mechanism consists of two tubes, $O^2$ and $O^4$, which are arranged side by side on the table $T^3$. The inner one of these tubes has a piston, U', and a top-feed opening, $d^2$, and the outer tube has a piston, $U^2$, and a top-feed opening, $d^3$. These feed-openings are arranged in the tubes side by side and immediately beneath the discharge end of the trough L. These pistons are arranged to alternatingly move in said tubes in reciprocation, so as to force therefrom, into a match-box placed on the end of each of the tubes, the match-blanks coming from the trough L, and by a continuation of the same motion to force the filled boxes from off the tubes.

The letter $R^6$ designates a rack, which is provided with teeth upon both of its sides, and having a grooved guideway on its under side. (Not shown in the drawings.) This rack $R^6$ receives power and reciprocating rotation from the combined action of the beveled pinion P; the facing gear-wheels E E having broken-out or omitted gears, and the shaft N', as before described.

The letter $R^7$ indicates a rack that also has a grooved guideway on its under side that is not shown; the letter $c$, a pinion having a pintle or shaft on which it turns, and this pinion meshes into the adjacent sides of both racks $R^6 R^7$. As thus arranged, when the segmental rack-wheel K actuates the rack $R^6$ in one direction the latter actuates the pinion $c$, to move the rack $R^7$ in an opposite direction.

Each of the pistons U' and $U^2$ has a piston-rod, $r^3$, with a headed outer end, $e^6$, and the letters $G^6$ indicate guides attached to the tops of each of the racks for the passage of said piston-rods.

The letters $d^6$ designate a spiral spring arranged on each of the piston-rods between its headed end $e^6$ and the guide $G^6$.

The letters $L^3$ designate latches, one of which is pivoted to the outer side of each of the racks, said latches each having a hook-form end, $l^6$, and being provided with a keeper-spring, $m^6$, which acts to keep the inner ends of said latches down and the outer hook-form ends up.

The letters $t^6 t^6$ designate tripping-bars, each of which is attached to the table $T^3$, adjacently to one of the latches of each rack, and these tripping-bars are each constructed with a friction-roller, $w^6$, that is adapted to engage with a projection, $a^6$, on the lower side of each one of the latches $L^3$, to which the tripping-bar is adjacent. The function of these tripping-bars is by the engagement of their friction-wheels or rollers $w^6$ with the projections $a^6$ on the latches, to independently force upward the inner end of each one of the latches, so as to unhook the outer end from off the end of the piston-rod, when the piston moving with the latter has made its traverse through the tube to force the blanks therein into a box and the latter from off the tube.

Thus constructed, as the racks $R^6$ and $R^7$ are alternatingly reciprocated, as before described, when moving toward boxing-tubes, the hook-form ends of the latches of each of the racks hook onto the headed end of one of the piston-rods, and draws the latter and the connected piston, forcing the latter to pass into and through one of the boxing tubes in alternating sequence, and in the interim each one of the latches is tripped, as before described, and the pistons and piston-rods are drawn back by the stored-up recoil force of the springs $d^6$.

The letters H' and $H^2$ designate two oppositely-placed hopper-guides, each of which has a hinging-connection made with a support, $d^7$, arranged on the table $T^3$. This hinging-connection is made by a hinging-rod, $h^7$, passing through a cylinder-form tube, $c^7$, to which latter the outer ends of each of the hopper-guides are attached, there being two side arms to each of the hopper-guides, and these arms are in each hopper-guide designated by the letters $b^7 b^7$.

The letters $a^7$ designate a spring-arm projected downwardly from the cylinder of each of the hopper-guides, and $n^7$ a spring connecting with the ends of each of the arms, said spring intermediately passing through an opening, $y^7$, made in the base of the center wedge-form piece, $A^7$. This center piece, $A^7$, is fixed to the table $T^3$, and projected upwardly between the sides of the two boxing-tubes $O^2$ $O^4$, and the inclined surfaces of this wedge-form center piece (indicated at $r^7$) run down to the top openings, $d^2$ $d^3$, in the boxing-tubes on the inner side of the said openings.

The trough L is arranged to deliver the blanks immediately over the upper edge of this wedge-form center piece. The tops of the guide-hoppers are rounded off at $t^7$, so that when either set of the hopper-guides are down within the cross openings $m^7$ of the center piece, $A^7$, the rounded-off part $t^7$ of the hopper-guide that is down, and the adjacent inclined surface $r^7$ of the center piece, form a connected inclined passage-way for the blanks through the top opening of the tube whereat the hopper-guide is up, and thus, as these hopper-guides are oscillated, the blanks coming from the trough L are alternatingly diverted from one tube to the other thereby.

The letters $e^7$ indicate an offset formed on the outer side of the hinging-tubes of each of the hopper-guides, and $f^7$ a cam-roller arranged on a pintle constructed on each of said offsets.

The letter $z^7$ designates cam-rollers arranged on the short cross-shaft J, the latter receiving power, as before described, from the cross-shaft N'. These cams $z^7$ are constructed on the shaft J, so that they will alternately raise up and depress each of the hopper-guides as said shaft rotates, and thus alternatingly guide the current of the falling blanks from one boxing-tube to the other.

To produce match-blanks from the mechanism thus described and illustrated, a veneer of wood having a thickness equal to about twice the depth of the grooves in each of the cutting-rollers R' R² is used. This veneer is cut across the grain to make strips from it equal in width to the required length of the match, and each strip is fed into and between the cutting-rollers, with the grain of the wood parallel to the grooves formed in the rollers 2. In passing between these cutting-rollers the blanks are cut by the edges of the grooves, but they adhere where the ring-form grooves are made in said cutting-rolls, and in a sheet form are stripped from off the cutting-rollers by the fingers of the horizontal trough $d'$, and by said fingers guided into the latter, being forced close up to its side by the spring $l$. When the veneer of partly-cut blanks reaches the curved passage-way $a^3$, formed between the rubber roller I and the curved guide-plate C', they are separated in passing abruptly over the square edge $O^4$ of the horizontal trough or passage $d'$ by the action of said rubber roller, which carries them down along and over the polishing-surface $y$, when the latter is used, and discharges them into the trough L, as before described, from whence they pass to the boxing mechanism. When the blanks fall into the latter, the pistons are reciprocated by the racks and their connections with such speed as it is desired to have the hoppers oscillate, so as to deliver a regular number of blanks into the tube to fill a box at each reciprocation of the pistons. The speed at which the hoppers oscillate and that at which the boxing-pistons are moved is regulated to meet the delivery capacity of the cutting-rollers by the relative size of the gear-wheels on the cross-shafts N' and J.

The cutting-rollers R' and R², made with their grooves and intermediate cutting-edges parallel to their axes, when combined with the ring-form grooves circumferentially arranged on said rollers, and the passage-way or trough $d'$, made with the finger $f'$, adapted to strip said partly-cut veneer from the lower roller, may be used without the other parts for partly cutting the veneer into blanks, and for removing it to be finished in other ways. The said rubber roller and the guide-plate C' having a concave surface may be used without the polishing-surface on the latter, as the rolling of the blanks over the said curved guide-plate will of itself clean the blanks from adhering fiber; and so, also, the said rubber roller and the curved guide-plate with or without a polishing agent, may be used without the saw when the pointing of the blanks is not desired.

In a former application made by us, which was filed in the Patent Office November 12, 1883, and is now pending, the cutting-rollers R' and R² are shown as arranged to operate in the same manner, our improvement herein as relates thereto consisting in making ring-form grooves on the circumferential face of said rollers, and in the combination therewith of means to enter the ring-form grooves of said cutting-rollers to underrun and strip therefrom the sheet of partly-severed blanks. In the older application alluded to the rollers are arranged to completely cut the blanks, while in this application, by means of the ring-form grooves arranged on each of the cutting-rollers in vertical coincidence, portions of the veneer are not cut, so that it retains a sheet form after leaving the rollers. In said application we show, also, a boxing-tube having a stationary hopper, and a piston actuated to reciprocate in said tube and to force the blanks that fall from the hopper in the boxing-tube into a match-box on the end of the tube, and the filled box from off the latter, our improvements upon this older construction relating to the method of connectedly operating two boxing-tubes and pistons for the same purpose.

We make no claim in this application to severing-rollers having parallel straight grooves, with coincident severing-edges extended across the faces of the rollers, except as the same enter into and are modified and restricted by the element of annular grooves arranged at right angles to the axes of the rollers to receive the stripping-fingers, the rollers without the annular grooves arranged at right angles to the axes forming the subject-matter of another application, filed November 12, 1883, numbered 111,516.

Having thus described our invention, what we claim, and desire to secure by Letters Patent, is—

1. In a machine for making match blanks or splints, the combination of rollers R' and R², connected by gears to rotate as described, said rollers having grooves and intermediate cutting-edges arranged parallel to their axes, and the ring-form grooves $g^2 g^2$, arranged in the cylindrical faces thereof circumferentially to their axes, and the conveying-trough or passage-way $d'$, made with the fingers $f'$, as and for the purposes set forth.

2. In a machine for making match blanks or splints, the combination of the rollers R' and R², connected by gears to rotate as described, said rollers having grooves and intermediate cutting-edges arranged parallel to their axes, and the ring-form grooves $g^2 g^2$, arranged in the cylindrical faces thereof circumferentially to their axes, and the conveying-trough or passage-way $d'$, made with the fingers $f'$ and $f^2$, as and for the purposes set forth.

3. The combination of the rollers R' and R², formed with parallel grooves having intermediate coincident severing-edges and provided with circumferential grooves $g^2 g^2$, the trough $d'$, arranged to receive the blanks from the cutting-rollers, and having stripping-fingers projected within said circumferential grooves of the cutting-rollers, the concave guide-plate C', and the rubber roller I, arranged across the said concave guide-plate and in juxtaposition thereto, all substantially as and for the purposes specified.

4. In combination with the severing-rollers made as described, the trough $d'$, arranged to receive the cut blanks, the concave guide-plate C', arranged at the delivery end of said trough, and having a polishing-exterior, $y$, and the rubber roller I, arranged to roll the match-blanks along and over said concave guide-plate, substantially as and for the purpose set forth.

5. In a machine for making match-blanks, the combination of the rubber roller I, made with the ring-form grooves G², the curved surface C', having a polishing-exterior, $y$, and the trough L, made with the fingers $f^4$, said parts being constructed and arranged to be operated, substantially in the manner as and for the purposes set forth.

6. In combination with the severing-rollers, the trough $d'$, arranged to receive the cut blanks, the concave guide-plate C', arranged at the delivery end of said trough, the rubber roller I, arranged to roll the match-blanks along over said concave guide-plate, and a circular saw, V, having beveled teeth and mounted on a hub-bearing, $l^4$, rotated independently on the rubber-roller shaft with the free face of the saw contiguous to the end of the rubber roller, substantially as described, and for the purpose set forth.

7. The combination of the trough $d'$, the concave guide-plate C', the rubber roller I, having the circumferential grooves $g^2 g^2$, said concave guide-plate and rubber roller being arranged at the delivery end of said trough, and in relative position to receive the blanks and move them forward between their adjacent surfaces, and the trough L, provided with fingers $f^4$, all substantially as described.

8. The combination of the concave guide-plate C' and the rubber roller I, arranged to receive a series of match-blanks between their adjacent surfaces, the circular saw V, made with beveled teeth and constructed to turn on said rubber-roller shaft at the side thereof and independent of said rollers, with its teeth in contact with the projecting ends of the match-blank, substantially as described.

9. In a machine for boxing match-blanks, the combination of two boxing-tubes, O² O⁴, made with top openings and arranged side by side, the pistons U' and U², each having a headed end and provided with the spring $d^6$, the racks R⁶ and R⁷, each constructed with the guide G⁶ and the pivoted latch L³, the pinion $c$, the tripping-bar $t^6$, and the rack-wheel K, the latter being arranged to be reciprocatingly rotated, substantially as and for the purposes set forth.

10. In a boxing mechanism for a match-machine, the combination of the boxing-tubes O² O⁴, having top openings, and arranged side by side, the center piece, A⁷, having inclined sides, a piston constructed to be alternatingly reciprocated in each of said tubes, and the hopper-guides H' H², constructed to oscillate intermediately to the reciprocation of each of said pistons, substantially in the manner as and for the purposes set forth.

Signed at Troy, New York, this 29th day of January, 1885, and in the presence of the two witnesses whose names are hereto written.

GEORGE E. NORRIS.
WILLIAM E. HAGAN.

Witnesses:
CHARLES S. BRINTNALL,
WILLIAM F. BIDWELL.